(12) United States Patent
Beck

(10) Patent No.: US 6,687,837 B1
(45) Date of Patent: Feb. 3, 2004

(54) METHOD AND SYSTEM FOR CONTROLLING THE SUPPLY OF POWER TO A CIRCUIT CARD IN A CARD SHELF THROUGH AN ACTIVATION SIGNAL

(75) Inventor: Roy L. Beck, Petaluma, CA (US)

(73) Assignee: Cisco Technology, Inc., San Jose, CA (US)

( * ) Notice: Subject to any disclaimer, the term of this patent is extended or adjusted under 35 U.S.C. 154(b) by 455 days.

(21) Appl. No.: 09/596,228

(22) Filed: Jun. 15, 2000

(51) Int. Cl.[7] .............................. G06F 1/28; G06F 13/00
(52) U.S. Cl. ..................... 713/300; 710/301; 710/302
(58) Field of Search ........................ 709/250; 710/302; 713/300, 330

(56) References Cited

U.S. PATENT DOCUMENTS

| | | | | |
|---|---|---|---|---|
| 4,937,806 A | * | 6/1990 | Babson et al. ............. | 369/75.1 |
| 4,977,593 A | * | 12/1990 | Ballance ........................ | 380/2 |
| 5,268,592 A | * | 12/1993 | Bellamy et al. .............. | 307/43 |
| 5,386,567 A | * | 1/1995 | Lien et al. ................... | 395/700 |
| 5,524,254 A | * | 6/1996 | Morgan et al. ............. | 709/245 |
| 5,530,302 A | * | 6/1996 | Hamre et al. ............... | 307/147 |
| 5,613,130 A | * | 3/1997 | Teng et al. .................. | 713/300 |
| 5,726,506 A | * | 3/1998 | Wood ........................... | 307/147 |
| 5,758,102 A | * | 5/1998 | Carey et al. ................. | 710/302 |
| 6,125,417 A | * | 9/2000 | Bailis et al. ................. | 710/302 |
| 6,237,103 B1 | * | 5/2001 | Lam et al. ................... | 713/330 |
| 6,415,346 B1 | * | 7/2002 | Mueller et al. ............. | 710/302 |
| 6,418,481 B1 | * | 7/2002 | Mancusi et al. ............ | 709/250 |

OTHER PUBLICATIONS

Vicor Corporation, Hot Swap Capability Eliminates Down Time, Apr. 2000, Rev2, pp. 1–4.*

* cited by examiner

Primary Examiner—Thomas Lee
(74) Attorney, Agent, or Firm—Baker Botts L.L.P.

(57) ABSTRACT

A method and system for controlling the supply of power to a circuit card in a card shelf includes automatically generating a deactivation signal in response to disconnection of a non-power link between the circuit card and a backplane of the card shelf. Power is automatically removed from a power link between the circuit card and the backplane while the power link is connected in response to the deactivation signal. An activation signal is automatically generated in response to connection of the non-power link between the circuit card and the backplane. The supply of power is automatically restored to the power link between the circuit card and the backplane in response to the activation signal. The activation signal and deactivation signal may be disparate values of a common signal.

39 Claims, 2 Drawing Sheets

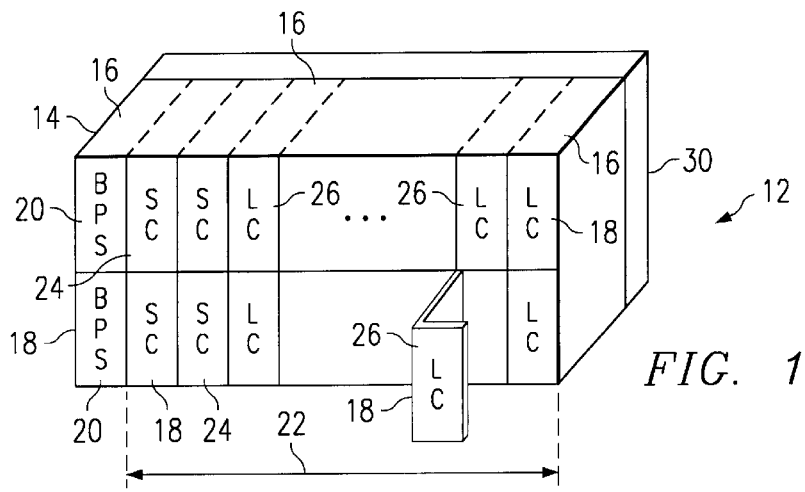
FIG. 1
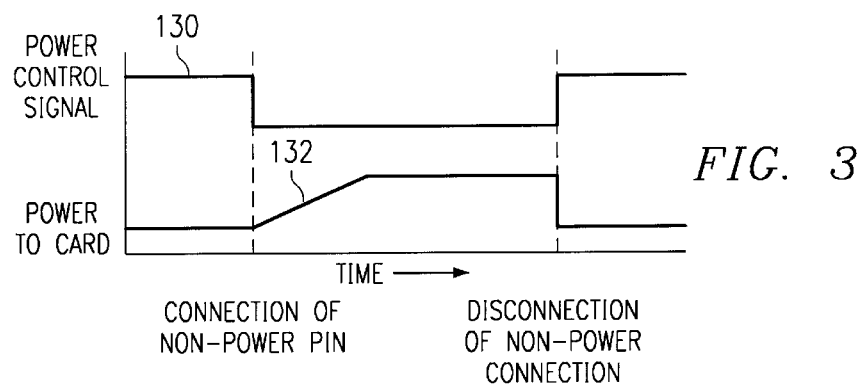
FIG. 3
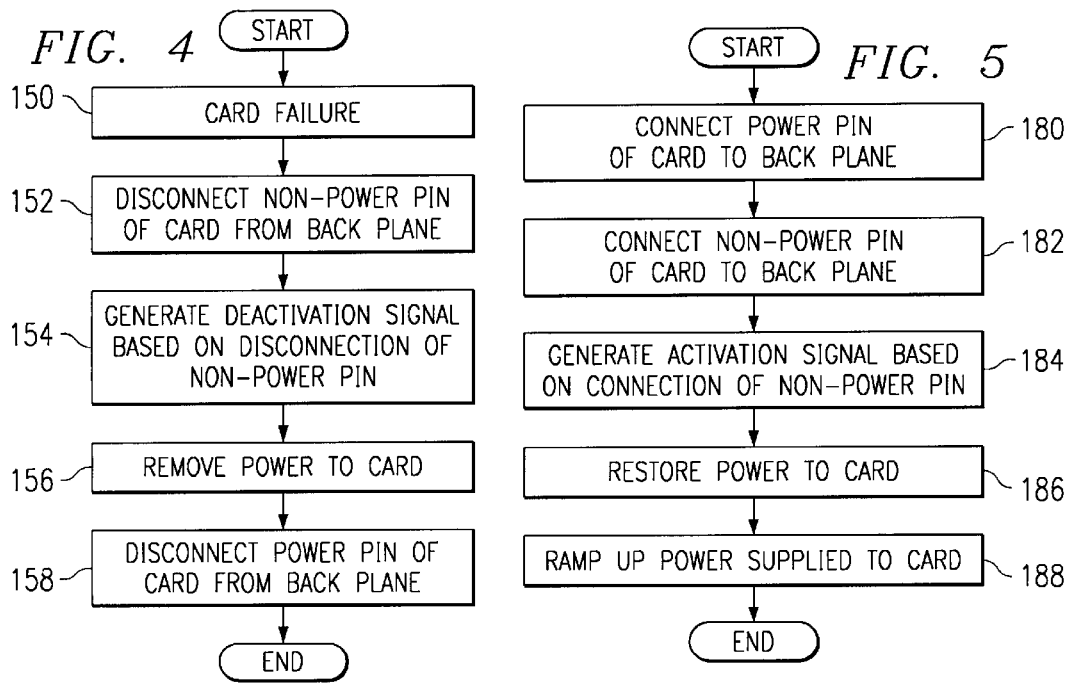
FIG. 4
FIG. 5

METHOD AND SYSTEM FOR CONTROLLING THE SUPPLY OF POWER TO A CIRCUIT CARD IN A CARD SHELF THROUGH AN ACTIVATION SIGNAL

TECHNICAL FIELD OF THE INVENTION

This invention relates generally to the field of modular card shelf systems, and more particularly, to a method and system for controlling the supply of power to a circuit card in a card shelf.

BACKGROUND OF THE INVENTION

Telecommunications systems are generally configured as modular card shelf assemblies to optimize space efficiency within a central office or other similar facilities. Card shelves include discrete circuit cards having different functions that communicate with each other and that receive power across a backplane. The circuit cards each individually plug in to the backplane, that allows any card to be easily replaced in the event of failure.

In many applications, some or all of the circuit cards must be hot-swappable in that they can be inserted and extracted from the card shelf while the card shelf is completely powered up and operational. Because the power supply is active during hot-swapping operations, circuit cards being inserted and extracted from the card shelf often arc to the backplane across the power connection pins during insertion and extraction.

A traditional technique to solve the arcing problem during hot-swapping operations is to use filtering capacitors on the power connection pins to protect the circuitry. The use of capacitors, however, adds expense to the system, is not reliable, and can affect operational signal characteristics. Another traditional technique to counter arcing is to use connection pins of different lengths in order to control the order at which circuits on the card being swapped are connected to or disconnected from the backplane. This approach requires careful analysis of the order to power up the circuits, is unreliable and involves some amount of arcing.

SUMMARY OF THE INVENTION

The present invention provides a method and system for controlling the supply of power to circuit cards in a card shelf that substantially eliminate or reduce the problems and disadvantages associated with previous systems and methods. In particular, the supply of power to power connectors on the backplane for a card is individually controlled to allow the card to be connected to or disconnected from the backplane while power to the connectors, and thus the card, is shut off.

In accordance with one embodiment of the present invention, a method and system for controlling the supply of power to a circuit card in a card shelf includes automatically generating a deactivation signal in response to disconnection of a non-power link between the circuit card and a backplane of the card shelf. Power is automatically removed from a power link between the circuit card and the backplane while the power link is connected in response to the deactivation signal.

More specifically, in accordance with a particular embodiment of the present invention, the deactivation signal is automatically generated in response to disconnection of a non-power link between the circuit card and the backplane. The non-power link is configured to disconnect prior to disconnection of the power link. The non-power link may include a pin that is shorter than a power pin of the power link.

In accordance with another aspect of the present invention, an activation signal is automatically generated in response to connection of the non-power link between the circuit card and the backplane of the card shelf. The supply of power is automatically restored to the power link between the circuit card and the backplane in response to the activation signal. The activation signal and the deactivation signal may be disparate values of a common signal. In this and other embodiments, the supply of power to the power link is controlled at the power supply.

Technical advantages of the present invention include providing an improved card shelf for a telecommunications node. In particular, the card shelf automatically controls the supply of power to circuit cards to allow the cards to be hot-swapped without arcing. Accordingly, the cards can be safely inserted and/or removed during operation of the node.

Another technical advantage of the present invention includes providing an improved method and system for inserting and extracting circuit cards in an operational card shelf. In particular, the supply of power to power connectors for a card is automatically shut off when the card is disconnected from the backplane. The supply of power to the power connectors is automatically resumed after a replacement card has been connected to the backplane. Accordingly, arcing between the card and the backplane is eliminated during insertion and extraction operations.

Still another technical advantage of the present invention includes providing a method and system for controlling the supply of power to card slots at the power supply. In particular, the supply of power is controlled at the power supply to remove power from backplane connections for a card slot during hot-swapping operations. By controlling the supply of power to the cards at an off-card location, space is saved on the card and additional features may be added.

Yet another technical advantage of the present invention includes providing an improved method and system for providing power to circuit cards during hot swap operations. During card extraction, power is immediately shut off prior to disconnection of the circuit card. During card connection operations, power is ramped up only after connection of the card to the backplane. Thus, circuit powering is completely controlled during card hot-swapping.

Other technical advantages of the present invention will be readily apparent to one skilled in the art from the following figures, descriptions and claims.

BRIEF DESCRIPTION OF THE DRAWINGS

For a more complete understanding of the present invention and its advantages, reference is now made to the following description taken in conjunction with the accompanying drawings, in which:

FIG. 1 is a schematic diagram illustrating a card shelf for a telecommunications node in accordance with one embodiment of the present invention;

FIG. 3 is a timing diagram illustrating the supply of power to the circuit card of FIG. 2 in response to an activation signal communicated between the circuit card and power supply in accordance with one embodiment of the present invention.

FIG. 4 is a flow diagram illustrating a method for controlling power to a circuit card during extraction of the circuit card from a card shelf in accordance with one embodiment of the present invention; and FIG. 5 is a flow diagram illustrating a method for controlling the supply of power to a circuit card during insertion of the circuit card into a card shelf in accordance with one embodiment of the present invention.

DETAILED DESCRIPTION OF THE INVENTION

Figure 2:
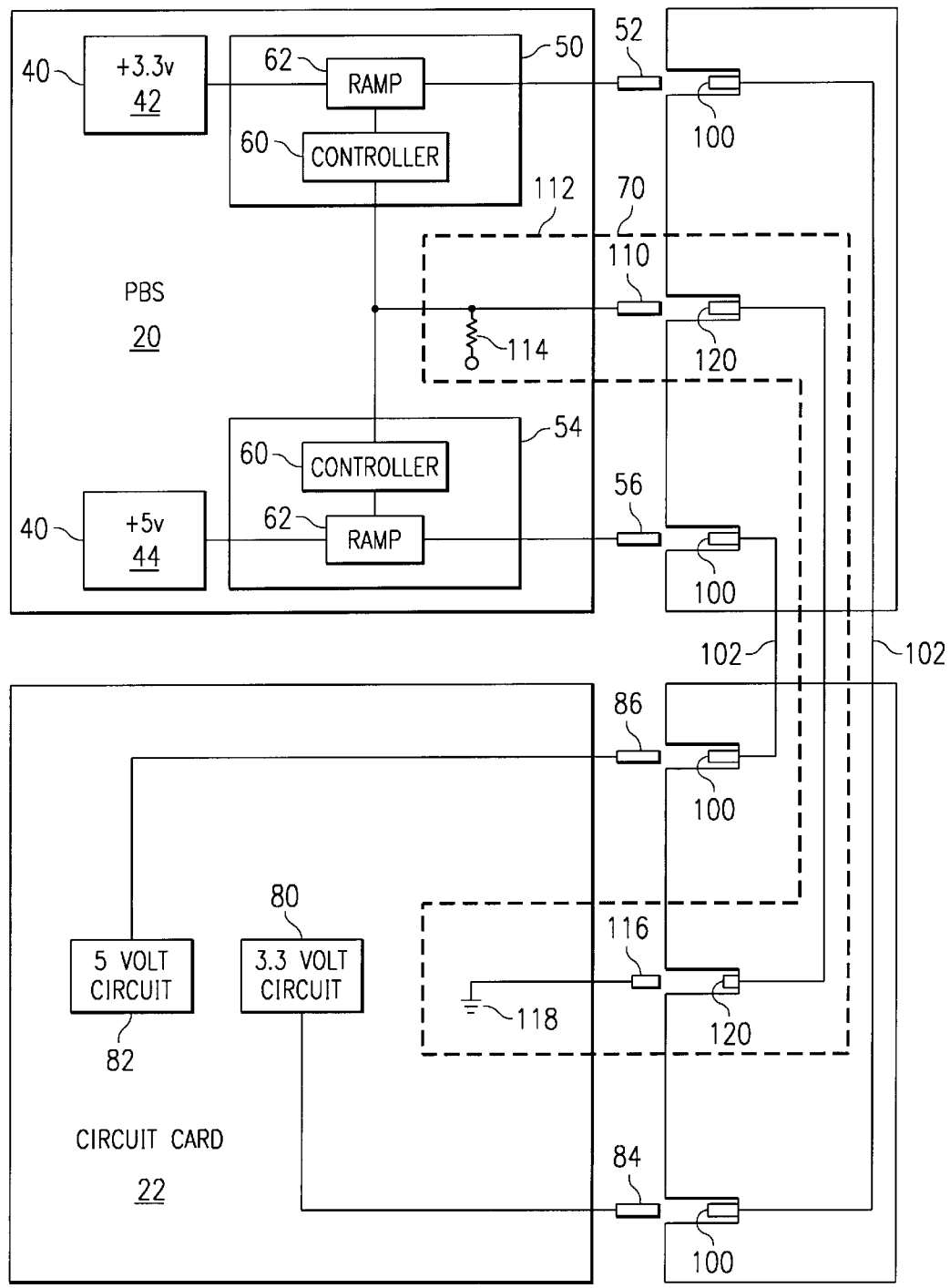
FIG. 2 is a block diagram illustrating the connection of a circuit card to a power supply of the card shelf of FIG. 1 in accordance with one embodiment of the present invention.

FIG. 1 illustrates a telecommunications node 12 in accordance with the present invention. The telecommunications node 12 is implemented as a card shelf 14 with functionality of the device distributed between discrete cards over a backplane. The card shelf 14 may be any suitable type of modular electronic system in which cards may be individually connected to and disconnected from the backplane while the system is operational to allow cards to be replaced in the event of failure. The cards may be of any suitable type of structure operable to be readily connected and disconnected from the backplane. The backplane may be one or more structures that include a set of buses and other links that provide interconnectivity between the cards.

Referring to FIG. 1, the card shelf 14 includes a plurality of card slots 16, each configured to receive a card 18. As used herein, each means every one of at least a subset of the identified items. The cards 18 include working and protect power supply cards 20 and circuit cards 22. The power supply cards 20 provide power for the card shelf 14. The circuit cards 22 may be printed circuit boards or other suitable structures that include one or more integrated or other suitable circuits that perform functions of the node 12. Each circuit card 22 may include processors and other hardware as well as software stored in RAM, ROM and/or other suitable computer readable medium for performing the functionality of the card.

For the telecommunications node 12, the circuit cards 22 include switch cards 24 and line cards 26. The power supply cards 20 each receive and convert standard DC current to DC current for use by the switch cards 24 and line cards 26. As described in more detail below, the switch cards 24 and line cards 26 are hot-swappable in that they can be inserted into and extracted from the card shelf 14 while the shelf is fully powered up and operational. Thus, switch cards 24 and line cards 26 that have failed can be replaced without shutting down the telecommunications node 12. It will be understood that other suitable types of circuit cards 22 may be included in the card shelf 14 to support operation of the telecommunications node 12.

The switch cards 24 switch traffic between the line cards 26. In one embodiment, the switch cards 24 perform synchronous base switching such as time division muliplex (TDM) switching and cell-based switching for asynchronous transfer mode (ATM) cell traffic, ATM adaption layer (AAL) cell traffic, and frame relay traffic. The switch cards 24 may also convert traffic between the TDM and the ATM realms to establish cross-connections between disparate types of line cards 26.

The line cards 26 each include one or more external interfaces or ports, one or more internal interfaces and a traffic processor. The ports receive ingress traffic from an external line and/or transmit egress traffic received by the internal interfaces from the switch cards 24. The internal interfaces transmit ingress traffic received by the ports from the external links and receive egress traffic from the switch cards 24.

The circuit cards 22 each include connectors that plug in to the backplane 30 of the card shelf 14. The backplane 30 includes power links to supply power from the power supply cards 20 to the switch cards 24 and line cards 26, power control links to control the supply of power from the power supply cards 20 to the switch line and cards line 24 and 26, control links for controlling the operation of the power supply, switch and line cards 20, 24, and 26, and traffic links for transferring traffic between the switch and line cards 24 and 26.

FIG. 2 illustrates connection of a switch card 24, line card 26, or other suitable circuit card 22 to the power supply card 20 over the backplane 30 of the card shelf 14 in accordance with one embodiment of the present invention. In this embodiment, the circuit card 22 is connected to the backplane 30 with pins that extend from the card 22 and engage with mating connectors on the backplane 30. It will be understood that some or all of the pins may be on the backplane 30 with the receptors on the circuit card 22 and that other suitable types of connectors operable to allow power and/or signals to be transmitted over the connection without significant degradation may be used without departing from the scope of the present invention.

Referring to FIG. 2, the power supply card 20 includes one or more power supplies 40 for the circuit card 22. In one embodiment, the power supply card 20 includes a substantially 3.3 volt power supply 42 and a substantially 5 volt power supply 44 for the circuit card 22. It will be understood that other or additional power supplies 40 may be provided to support operation of the circuit card 22.

For the illustrated embodiment, a first power supply controller 50 is connected between the 3.3 volt power supply 42 and a first power connector pin 52. A second power supply controller 54 is connected between the 5 volt power supply 44 and a second power connector pin 56. As described in more detail below, the power supply controllers 50 and 54 each automatically remove and restore power to the power connector pins 52 and 56 in response to extraction and insertion of the circuit card 22, respectively. As used herein, the term in response to means directly or indirectly following the identified event. Thus, additional events may intervene.

Each power supply controller 50 and 54, includes a controller 60 and a power ramp 62. The controller 60 is connected to a card insertion/extraction signaling system 70 that indicates the insertion and the extraction of the circuit card 22. In response to the extraction of the circuit card 22 from the card shelf 14, the controller 60 removes power from the power connector pins 52 and 56. Conversely, in response to insertion of the circuit card 22 into the card shelf 14, the controller 60 restores power to the power connection pins 52 and 56. The power ramp 62 ramps up power upon its restoration to protect circuits within the circuit card 22 and to minimize or eliminate arcing within power connections.

The circuit card 22 includes a 3.3 volt circuit 80 that operates using power from the 3.3 volt power supply 42 and a 5 volt circuit 44 that operates using power from the 5 volt circuit 44. It will be understood that other or different circuits may be included on the circuit card 18. The 3.3 volt circuit 80 is connected to a power connector pin 84 while the 5 volt circuit is connected to a power connector pin 86.

The backplane 30 includes power pin receptors 100 configured to mate with corresponding power connector pins 52, 56, 84, and 86 of the power supply and circuit cards 20 and 22. Power links 102 connect the power receptors 100, and thus the power supply and circuit cards 20 and 22, over the backplane 30.

The card insertion/extraction signaling system 70 includes components that are distributed across the power supply card 20, the circuit card 22, and the backplane 30. On the power supply card 20, the card insertion/extraction signaling system 70 includes a non-power connector pin 110 connected to the controller 60 and to a power node 112 through a pull-up resistor 114. On the circuit card 22, the signaling system 70 includes a non-power connector pin 116 connected to a ground node 118. On the backplane 30, the signaling system 70 includes non-power receptors 120 configured to mate with the corresponding non-power connector pins 110 and 116 of the power supply and circuit cards 20 and 22. The non-power connector pins and receptors form non-power connections in that they do not carry operational power generated by the power supply card 20 for power-up and operational use by the circuit card 22.

The non-power connector pin 116 on the circuit card 22 is configured to disconnect from the corresponding receptor 120 prior to disconnection of the power pins 84 and 86 from their corresponding receptors 100 during card extraction and to connect to the receptor 120 only after connection of the power pins 84 and 86 to their corresponding receptors 100 during card insertion. Thus, upon card extraction and insertion, the power connections are connected when the non-power pin disconnects from or reconnects with the receptor 120. As described in more detail below, the power supply controllers 50 and 54 key off of the status of the non-power connection between the circuit card 22 and the backplane 30 to shut off power before the power connections are disconnected and to restore power only after the power connections are connected in order to prevent or minimize arcing during hot-swapping operations.

In operation, when the non-power pin node 116 is connected to the backplane 30, the ground node 118 pulls a power control signal on the line low indicating to the controllers 60 that the circuit card 22 is connected to the backplane 30. Upon extraction of the circuit card 22 from the backplane 30, the non-power pin 116 disconnects prior to the power pins 84 and 86, which allows the pull-up resistor 114 to pull the signal on the card insertion/extraction signaling system 70 high. This indicates to the controllers 60 that the card 22 is being extracted. In response, the controllers 60 remove power from the power connections to the circuit card 22 to prevent arcing upon disconnection of the power connections between the circuit card 18 and the backplane 30.

Upon insertion of the circuit card 22, power pins 84 and 86 are first connected to the backplane 30 followed by the non-power pin 116. Upon connection of the non-power pin 116 to the backplane 30, the ground node 118 pulls the power control signal on the card insertion/extraction signaling system 70 low indicating to the controllers 60 that the circuit card 22 is again connected to the backplane 30. In response, the controllers 60 restore power to the power connections through the ramp 62. In this way, power is controlled at the power supply to prevent arcing during hot-swapping operations.

FIG. 3 is a timing diagram illustrating the supply of power to the circuit card 22 in response to the activation signal communicated between the circuit card 22 and the power supply card 20 in accordance with one embodiment of the present invention. In this embodiment, power to the circuit card 22 is cut off abruptly during card extraction and ramped up gradually during card insertion. It will be understood that the removal or restoration of power may be otherwise suitably controlled.

Referring to FIG. 3, the power control signal 130 is high when the circuit card 22 is not connected to the backplane 30. When the circuit card 22 is inserted into the card slot 16, the power pins 84 and 86 connect first followed by the non-power pin 116. Upon connection of the non-power pin 116, the power control signal is pulled low by the ground node 90. In response to the transition, the controllers 60 restore power 132 to the power connections and ramps up the power 132 over a predetermined period of time. Power 132 is supplied to the circuit card 22 while it remains connected to the backplane 30.

When the circuit card 22 is extracted from the card shelf 14, the power control signal 130 transitions indicating to the controllers 60 that the circuit card 22 is being extracted. In response, the controllers 60 abruptly remove power 132 from the power connections to prevent arcing when the power pins 84 and 86 are disconnected from the corresponding receptors 100. In this way, arcing is eliminated upon connection and disconnection of the power connections. Further, by ramping up the power upon its restoration, arcing is minimized within the connections.

FIG. 4 is a flow diagram illustrating a method for controlling power to a circuit card 22 during extraction of the circuit card 22 from a card shelf 14 in accordance with one embodiment of the present invention. In this embodiment, extraction and insertion of the circuit card 22 is signaled by a non-power connector pin 116 on the circuit card 22. It will be understood that insertion and extraction of the circuit card 22 may be otherwise signaled by a proximity detector or a switch suitably positioned on the backplane or other suitable location in the card slot 16 or card shelf 14.

The method begins at step 150 in which the circuit card 22 fails during operation of the card shelf 14 and is therefore in need of replacement. At step 152, a non-power pin of the circuit card 22 is first disconnected from the backplane 30 when the circuit card 22 is pulled from the backplane 30. Next, at step 154, a deactivation signal is generated based on disconnection of the non-power pin.

Proceeding to step 156, power is removed from power connections to the circuit card 22 in response to the deactivation signal. The power may be removed by open-circuiting the power feed at the power supply or otherwise preventing power from flowing to the power links on the backplane 30.

Next, at step 158, power connections of the circuit card 22 are disconnected and the card continues from the backplane 30. Because power is no longer supplied to the power connections, arcing between power pins and receptors is eliminated. Thus, a failed, inoperational or other circuit card 22 may be removed from a card shelf 14 for replacement without arcing.

FIG. 5 is a flow diagram illustrating a method for inserting a circuit card 22 into a card shelf 14 while the card shelf 14 is operational in accordance with one embodiment of the present invention. In this embodiment, insertion of the circuit card 22 is signaled by the non-power pin 116 of the circuit card 22. It will be understood that other suitable types of proximity detectors and switches may be used to signal insertion of the circuit card 22 into the card shelf 14. Referring to FIG. 5, the method begins at step 180 in which power connections of the circuit card 22 are connected to power feeds on the backplane 30 while the power to the feeds is shut off. At step 182, the non-power pin 116 of the circuit card 22 is connected to the backplane 30. Next, at step 184, an activation signal is generated based on connection of the non-power pin.

Proceeding to step 186, power is restored to the power feeds on the backplane 30, and thus supplied to the circuit card 22. Because the power connections were previously engaged, arcing between the power pins and receptors is eliminated. At step 188, power supplied to the circuit card 18 is ramped up gradually over a predefined period of time. In this way, power is only supplied to a circuit card 22 after power connections are fully connected to allow the circuit card 22 to be safely inserted while the card shelf 14 is operational without arcing. In addition, after the power is restored, it is gradually ramped up to prevent arcing within the connections and damage to the circuits.

Although the present invention has been described with several embodiments, various changes and modifications may be suggested to one skilled in the art. It is intended that the present invention encompass such changes and modifications as fall within the scope of the appended claims.

What is claimed is:

1. A method for controlling the supply of power to a circuit card in a card shelf, comprising:
    automatically generating a deactivation signal in response to disconnection of a non-power link between a circuit card and a backplane of a card shelf;
    automatically removing power from a power link between the circuit card and the backplane while the power link is connected in response to the deactivation signal;
    automatically generating an activation signal in response to connection of the non-power link between the circuit card and the backplane;
    automatically restoring the supply of power to the power link between the circuit card and the backplane in response to the activation signal; and
    automatically ramping up the supply of power to the power link between the circuit card and the backplane in response to the activation signal.

2. The method of claim 1, further comprising automatically removing power from the power link between the circuit card and the backplane at a power supply in response to the deactivation signal.

3. The method of claim 1, further comprising automatically removing power from a plurality of power links between the circuit card and the backplane in response to the deactivation signal.

4. The method of claim 1, further comprising abruptly removing power from the power link between the control card and the backplane in response to the deactivation signal.

5. The method of claim 1, wherein the power comprises three or more volts.

6. The method of claim 1, wherein the power comprises five or more volts.

7. The method of claim 1, further comprising automatically generating the deactivation signal in response to disconnection of a deactivation link between the circuit card and the backplane, the deactivation link configured to disconnect prior to disconnection of the power link.

8. The method of claim 7, wherein the deactivation link comprises a pin that is shorter than a power pin of the power connection.

9. The method of claim 1, wherein the activation signal and the deactivation signal are disparate values of a common signal, further comprising maintaining power to the power link during the duration of the activation signal.

10. The method of claim 1, further comprising automatically removing power from and restoring power to the power link between the circuit card and the backplane at the power supply.

11. The method of claim 1, further comprising automatically restoring the supply of power to a plurality of power links between the circuit card and the backplane in response to the activation signal.

12. The method of claim 1, further comprising automatically generating the activation signal in response to connection of an activation link between the circuit card and the backplane, the activation link comprising a pin configured to connect to the backplane after the power link.

13. The method of claim 12, wherein the activation pin is shorter than a power pin of the power link.

14. The method of claim 12, wherein the activation pin and the deactivation pin are a common pin.

15. The method of claim 1, further comprising automatically maintaining the removal of power from the power link while the power link is disconnected.

16. The method of claim 1, further comprising automatically maintaining the removal of power from the power link while the non-power link is disconnected.

17. A method for controlling the supply of power to a circuit card in a card shelf, comprising:
    automatically generating an activation signal in response to connection of a non-power link between a circuit card and a backplane of a card shelf;
    automatically supplying power to a power link between the circuit card and the backplane in response to the activation signal; and
    ramping up the supply of power to the power link between the circuit card and the backplane in response to the activation signal.

18. The method of claim 17, further comprising maintaining the supply of power to the power link between the circuit card and the backplane during the duration of the activation signal.

19. The method of claim 17, further comprising controlling at the power supply the supply of power to the power link between the circuit card and the backplane link.

20. The method of claim 17, further comprising automatically supplying power to a plurality of power links between the circuit card and the backplane in response to the activation signal.

21. The method of claim 17, further comprising automatically generating the activation signal in response to connection of an activation link between the circuit card and the backplane, the activation link comprising a pin configured to connect to the backplane after the power link.

22. A power supply card, comprising:
    a power supply;
    a power supply controller coupled between the power supply and a backplane power connector;
    a power ramp coupled between the power supply and the backplane power connector;
    the power supply controller operable to remove a supply of power from the power supply to the backplane power connector for a line card in response to a deactivation signal from the line card and to restore the supply of power from the power supply to the backplane power connector in response to an activation signal from the line card; and
    the power ramp operable to ramp up power from the power supply to the backplane connector in response to the activation signal.

23. The power supply card of claim 22, wherein the power supply comprises a substantially 3.3 volt power supply.

24. The power supply card of claim 22, wherein the power supply comprises a substantially 5.0 volt power supply.

25. The power supply card of claim 22, further comprising:
- a second power supply;
- a second power supply controller coupled between the second power supply and a second backplane power connector; and
- the second power supply controller operable to remove a supply of power from the second power supply to the second backplane power connector for the line card in response to the deactivation signal from the line card and to restore the supply of power from the second power supply to the second backplane power connector in response to the activation signal from the line card.

26. The power supply card of claim 25, wherein the power supply comprises a substantially 3.3 volt power supply and the second power supply comprises substantially a 5 volt power supply.

27. The power supply card of claim 22, further comprising a power supply controller for each of a plurality of line cards, the power supply controller for a line card coupled between a power supply and a backplane power connector for the line card and operable to remove the supply of power from the power supply to the backplane power connector for the line card in response to a deactivation signal from the line card and to restore the supply of power from the power supply to the backplane power connector in response to an activation signal from the line card.

28. The power supply card of claim 22 wherein the activation signal and the deactivation signal comprise disparate values of a common signal, further comprising:
- a backplane activation connector; and
- the backplane activation connector coupled to the power supply controller and operable to receive the common signal from the line card and to pass the common signal to the power supply controller.

29. The power supply card of claim 28, further comprising:
- an activation signal line between the power supply controller and the backplane activation connector, the activation signal line comprising a pull-up resistor connected to a voltage node; and
- the power supply controller operable to prevent power from the power supply from passing to the backplane power connector for the line card in response to a low signal on the activation signal line.

30. The power supply card of claim 19, further comprising the power supply controller operable to allow power from the power supply to pass to the backplane power connector in response to a high signal on the activation signal line.

31. The power supply card of claim 30, wherein the activation signal and the deactivation signal are disparate values of a common signal.

32. A circuit card for a telecommunications node, comprising:
- a power connector configured to engage with a first mating connector of a backplane of a card shelf;
- an activation connector configured to engage with a second mating connector of the backplane of the card shelf after engagement of the power connector with the first mating connector of the backplane;
- a ground node coupled to the activation connector to signal previous engagement of the power connector to the mating connector of the backplane; and
- wherein the power connector is operable to receive ramped up power from a power ramp circuit for operation of the circuit card.

33. The circuit card of claim 32 wherein the circuit card is a line card operable to transmit and receive telecommunications traffic to a remote destination and to pass the traffic to a local switch over the backplane.

34. The circuit card of claim 32 further comprising:
- a plurality of power connectors each configured to engage with a mating connector of the backplane; and
- the activation connector configured to engage with the mating connector of the backplane after previous engagement of all power connectors with the backplane.

35. A telecommunications node, comprising:
- a power supply card including a power supply;
- at least one circuit card including a circuit configured to operate using power from the power supply;
- a backplane connecting the power supply of the power supply card to the circuit of the circuit card;
- means for automatically generating an activation signal in response to connection of the non-power link between the circuit card and the backplane;
- means for automatically restoring the supply of power to the power link between the circuit card and the backplane in response to the activation signal; and
- means for automatically ramping up the supply of power to the power link between the circuit card and the backplane in response to the activation signal.

36. The telecommunications node of claim 35, further comprising:
- means for automatically generating a deactivation signal in response to disconnection of a non-power link between the circuit card and the backplane; and
- means for automatically removing power from a power link between the circuit card and the backplane while the power link is connected in response to the deactivation signal.

37. The telecommunications node of claim 36, further comprising means for abruptly removing power from the power link between the control card and the backplane in response to the deactivation signal.

38. The telecommunications node of claim 36, wherein the activation signal and the deactivation signal are disparate values of a common signal.

39. A system for controlling the supply of power to a circuit card in a card shelf, comprising:
- means for automatically generating an activation signal in response to connection of a non-power link between a circuit card and a backplane of a card shelf;
- means for automatically supplying power to a power link between the circuit card and the backplane in response to the activation signal; and
- means for automatically ramping up the supply of power to the power link between the circuit card and the backplane in response to the activation signal.

* * * * *

UNITED STATES PATENT AND TRADEMARK OFFICE
CERTIFICATE OF CORRECTION

PATENT NO. : 6,687,837 B1
DATED : February 3, 2004
INVENTOR(S) : Roy L. Beck

It is certified that error appears in the above-identified patent and that said Letters Patent is hereby corrected as shown below:

Column 9,
Line 16, after "substantially a" delete "5" and insert -- 5.0 --.
Line 47, after "claim" delete "19" and insert -- 29 --.

Signed and Sealed this

Twentieth Day of July, 2004

JON W. DUDAS
*Acting Director of the United States Patent and Trademark Office*